(12) United States Patent
Xiaopeng et al.

(10) Patent No.: US 8,184,802 B1
(45) Date of Patent: May 22, 2012

(54) ADAPTIVE ANALOG ECHO/NEXT CANCELLATION

(75) Inventors: Chen Xiaopeng, Sunnyvale, CA (US);
Runsheng He, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 994 days.

(21) Appl. No.: 12/215,956

(22) Filed: Jul. 1, 2008

Related U.S. Application Data

(62) Division of application No. 10/942,761, filed on Sep. 16, 2004, now Pat. No. 7,688,968.

(51) Int. Cl.
*H04M 9/08* (2006.01)
(52) U.S. Cl. .................................. 379/406.06
(58) Field of Classification Search .............. 379/406.06
See application file for complete search history.

(56) References Cited

U.S. PATENT DOCUMENTS

| | | | | |
|---|---|---|---|---|
| 5,920,834 A | * | 7/1999 | Sih et al. | 704/233 |
| 5,970,088 A | * | 10/1999 | Chen | 375/222 |
| 6,480,532 B1 | | 11/2002 | Vareljian | |
| 6,954,530 B2 | * | 10/2005 | Gunther | 379/406.02 |

OTHER PUBLICATIONS

IEEE Standards, IEEE Std 802.3-2002; Part 3: Carrier sense multiple access with collision detection (CSMA/CD) access method and physical layer specifications; Mar. 8, 2002.

* cited by examiner

*Primary Examiner* — Alexander Jamal

(57) ABSTRACT

An adaptive analog echo/near-end crosstalk (NEXT) cancellation system includes a bit slicer that receives a first analog receive signal and that generates a first error control signal. A digital signal processor (DSP) receives a digital receive signal and a digital transmit signal and generates second and third error control signals. A first summing module generates a fourth error control signal by summing the second and third error control signals. A selector outputs the first error control signal during a first mode and the fourth error control signal during a second mode. An echo/NEXT cancellation module communicates with the selector and generates an estimated echo/NEXT signal based on the first error control signal and an analog transmit signal during the first mode and based on the fourth error control signal and the analog transmit signal during the second mode.

42 Claims, 7 Drawing Sheets

ADAPTIVE ANALOG ECHO/NEXT CANCELLATION

CROSS-REFERENCE TO RELATED APPLICATIONS

This application is a divisional of U.S. patent application Ser. No. 10/942,761, filed Sep. 16, 2004. The disclosure of the above application is incorporated herein by reference in its entirety.

FIELD OF THE INVENTION

The present invention relates to echo/near-end crosstalk (NEXT) cancellation systems for network devices, and more particularly to echo/NEXT cancellation systems for Ethernet network devices.

BACKGROUND OF THE INVENTION

Ethernet network devices commonly utilize data communications media that include multiple full-duplex communications channels. For example, an Ethernet communications medium may include two or four pairs of twisted wire. An Ethernet network device that is compliant with IEEE 802.3ab (1000BASE-T) Gigabit Ethernet standards utilizes a data communications medium that includes 4 pairs of twisted wire. The Gigabit Ethernet network device also employs a full-duplex transmission scheme. Therefore, each of the 4 pairs of twisted wire simultaneously transmit and receive data. However, the transmit and receive signals overlap and may interfere with each other.

Referring now to FIG. 1, first and second exemplary Ethernet network devices 10 and 12, respectively, communicate over a data communications medium with four full-duplex channels 14-A, 14-B, 14-C, and 14-D. For example, the first and second Ethernet network devices 10 and 12, respectively, may be Gigabit Ethernet network devices. Each of the channels 14 at the first and second Ethernet network devices 10 and 12, respectively, are identified as A, B, C, or D and include a transceiver 16 and a hybrid 18. The transceivers 16 independently process transmitted and received data. The hybrids 18 facilitate full-duplex communications over the data communications medium.

Echo is interference between transmitted and received data on an individual channel. Echo may be generated when a near-end transmitted signal is reflected from a transmit path onto a receive path. Echo may also be generated when at least a portion of a transmitted signal on an individual pair of twisted wire is reflected back from the target device. FIG. 1 illustrates both near echo 20 and far echo 22 with respect to the transceiver 16-A-1 on channel A of the first Ethernet network device 10.

Near-end crosstalk (NEXT) is interference between received data on one channel and transmitted data on one or more of the remaining channels of a data communications medium. FIG. 1 illustrates NEXT interference 24-B, 24-C, and 24-D from channels B, C, and D 14-B, 14-C, and 14-D, respectively, that is received at channel A 14-A of the first Ethernet network device 10. Therefore, the received signal at channel A 14-A of the first Ethernet network device 10 potentially includes data transmitted from channel A 14-A of the second Ethernet network device 12, echo 20 and/or 22 from channel A 14-A of the first Ethernet network device 10, and NEXT 24-B, 24-C, and 24-D, respectively, from channels B, C, and D 14-B, 14-C, and 14-D of the first Ethernet network device 10.

Referring now to FIG. 2, a physical layer device 32 of an exemplary Ethernet network device processes data for a full-duplex communications channel of a data communications medium. The physical layer device 32 includes a receive path 34 and a transmit path 36. An input of a first analog filter 38 receives an analog receive signal from the communications channel. The first analog filter 38 filters the analog receive signal and generates a filtered receive signal. An input of an analog-to-digital converter (ADC) 40 receives the filtered receive signal and generates a digital receive signal. A first input of a digital signal processor (DSP) 42 receives the digital receive signal and generates a recovered bit pattern. In an exemplary embodiment, the DSP 42 transmits the recovered bit pattern to a descrambler in a physical coding sublayer (PCS) device in the physical layer device 32.

A second input of the DSP 42 in the receive path 34 receives a scrambled bit pattern from a scrambler in the PCS device. The DSP 42 outputs a digital transmission signal based on the scrambled bit pattern. An input of a digital-to-analog converter (DAC) 44 receives the digital transmission signal and generates an analog transmission signal. An input of a second analog filter 45 receives the analog transmission signal and outputs a filtered transmission signal. For example, the second analog filter 45 may transmit the filtered transmission signal to a line driver in the communications channel.

The input of the first analog filter 38 receives an echo signal. The echo signal is interference from the filtered analog transmission signal. The input of the first analog filter 38 also receives NEXT interference from the other communications channels of the data communications medium. The contribution of echo/NEXT interference may be significant compared to a remotely transmitted signal.

An echo/NEXT cancellation system may be employed to reduce adverse effects caused by echo/NEXT interference at the input of the first analog filter 38. In one approach, multiple analog and/or digital echo/NEXT cancellers are employed to reduce adverse effects from echo/NEXT interference signals in the channel. However, adjusting the operating parameters of multiple echo/NEXT cancellers is very complicated. Also, additional echo/NEXT cancellers require additional clock signals in the channel, which makes clock signal synchronization difficult.

SUMMARY OF THE INVENTION

An adaptive analog echo/near-end crosstalk (NEXT) cancellation system according to the present invention includes a selector that outputs a first error control signal when a first receive signal does not include a remotely transmitted signal and a second error control signal when the first receive signal includes a remotely transmitted signal. An echo/NEXT cancellation module communicates with the selector and generates an estimated echo/NEXT signal based on the first error control signal and a first transmit signal when the first receive signal does not include a remotely transmitted signal and based on the second error control signal and the first transmit signal when the first receive signal includes a remotely transmitted signal.

In other features, the first receive signal and the first transmit signal are from a first communications channel. In this case, the echo/NEXT cancellation module generates an estimated echo signal that is included in the first receive signal. Alternatively, the first receive signal is from a first communications channel and the first transmit signal is from a second communications channel. In this case, the echo/NEXT cancellation module generates an estimated NEXT signal that is included in the first receive signal.

In still other features of the invention, a system comprises the adaptive analog echo/NEXT cancellation system and further comprises a summing module that receives the first receive signal and the estimated echo/NEXT signal and that generates an echo/NEXT filtered receive signal by subtracting the estimated echo/NEXT signal from the first receive signal. A system comprises the adaptive analog echo/NEXT cancellation system and further comprises an analog filter that receives the first receive signal and that generates a filtered receive signal. The adaptive analog echo/NEXT cancellation system includes a bit slicer that receives the filtered receive signal and that generates the first error control signal.

In yet other features, a system comprises the adaptive analog echo/NEXT cancellation system and further comprises a first analog-to-digital converter (ADC) that receives the first receive signal and that generates a digital receive signal. A digital signal processor (DSP) receives the digital receive signal and generates a recovered bit pattern based on the digital receive signal. The DSP generates third and fourth error control signals. The adaptive analog echo/NEXT cancellation system includes a summing module that receives the third and fourth error control signals and that generates the second error control signal by summing the third and fourth error control signals.

In still other features of the invention, a digital-to-analog converter (DAC) receives a digital transmit signal and generates the first transmit signal. The DSP includes a digital echo canceller (DEC) module that generates the third error control signal based on the digital transmit signal and the fourth error control signal. The DSP includes a finite impulse response (FIR) filter that receives the digital receive signal and that generates a filtered digital signal. A bit detector receives the filtered digital signal and generates the recovered bit pattern. A summing module receives the filtered digital signal and the recovered bit pattern and generates the fourth error control signal by subtracting the filtered digital signal from the recovered bit pattern.

In yet other features, the selector includes a multiplexer that selectively outputs one of the first error control signal or the second error control signal. The echo/NEXT cancellation module includes a first ADC converter that receives the first transmit signal and that generates a sampled transmit signal. A product module receives the first error control signal when the first receive signal does not include a remotely transmitted signal and the second error control signal when the first receive signal includes a remotely transmitted signal and receives the sampled transmit signal. The product module generates an adaptation signal by multiplying one of the first or second error control signals and the sampled transmit signal. An adaptive analog filter generates the estimated echo/NEXT signal based on the first transmit signal and the adaptation signal.

In still other features of the invention, the echo/NEXT cancellation module further includes a delay module that selectively delays the one of the first or second error control signals. The echo/NEXT cancellation module further includes a loop filter that receives the adaptation signal and that generates a filtered adaptation signal. The adaptive analog filter generates the estimated echo/NEXT signal based on the first transmit signal and the filtered adaptation signal. A physical layer device comprises the adaptive analog echo/NEXT cancellation system. An Ethernet network device comprises the physical layer device. The physical layer device is compliant with at least one of IEEE 802.3ab (1000BASE-T) and/or IEEE 802.3an (10GBASE-T) standards.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
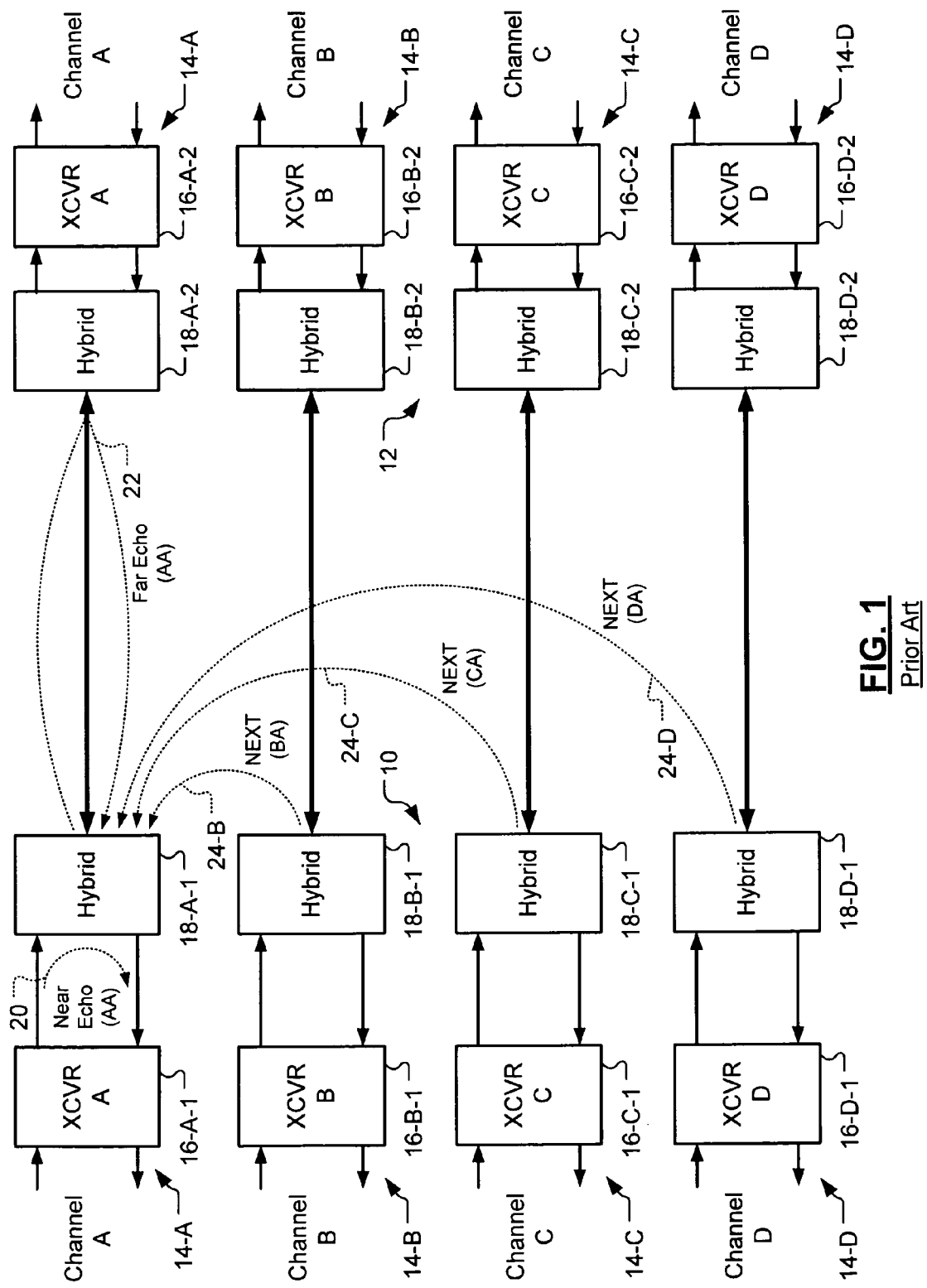
FIG. 1 is a functional block diagram of a data communications medium that includes four full-duplex communications channels according to the prior art.
Figure 2:
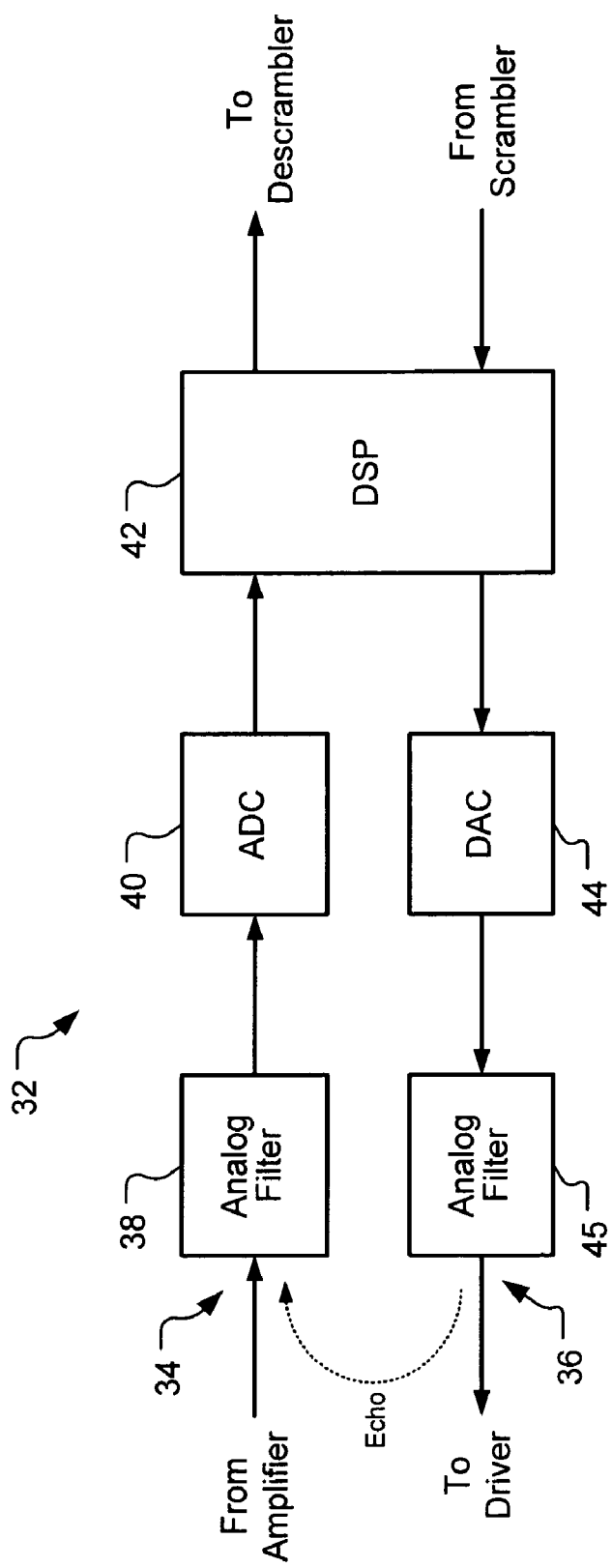
FIG. 2 is a functional block diagram of a physical layer device that processes incoming/outgoing data for a communications channel of a data communications medium according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 3:
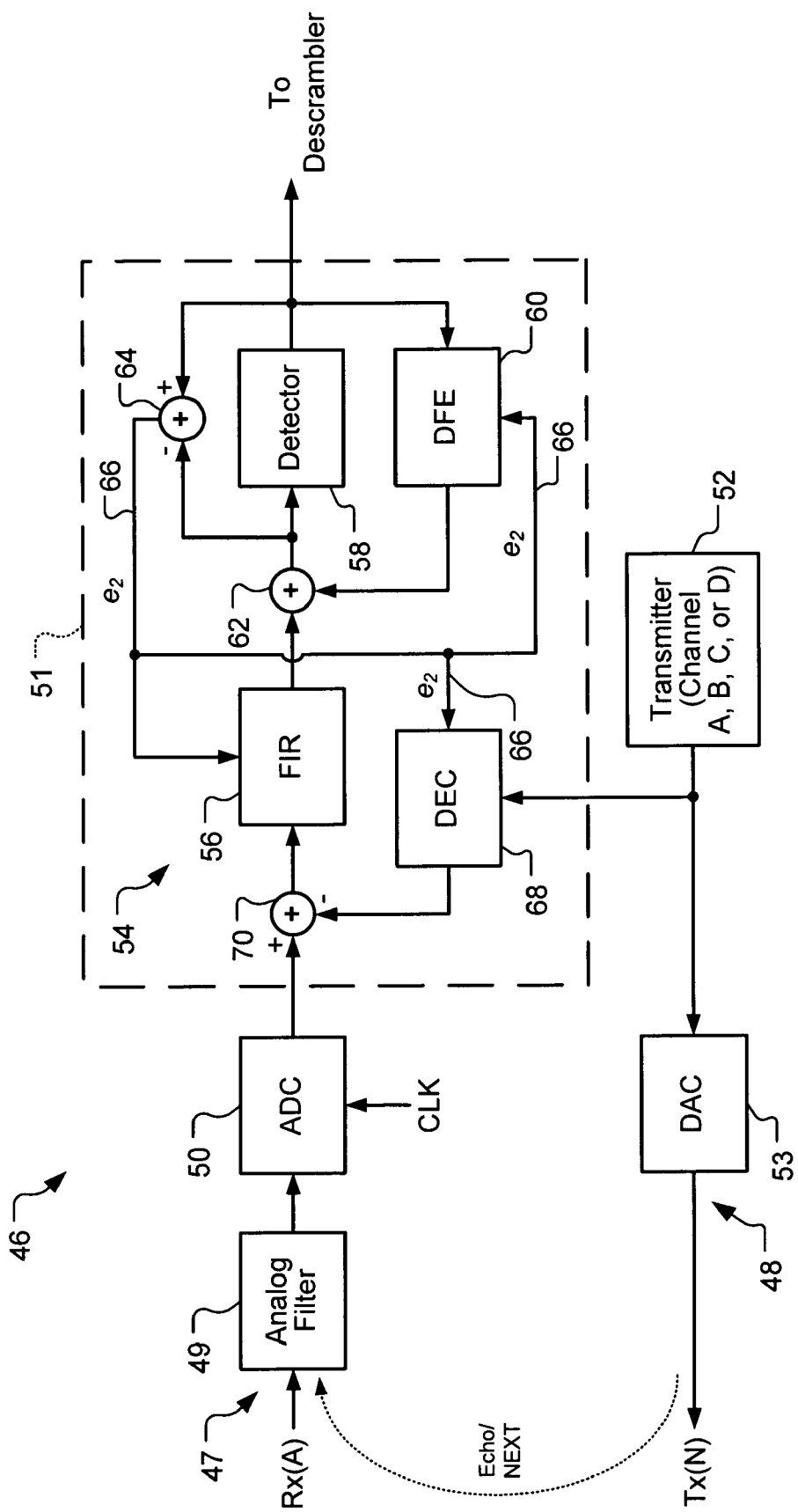
FIG. 3 is a functional block diagram of a physical layer device with a digital signal processor (DSP) that includes a digital echo/NEXT cancellation system.

Referring now to FIG. 3, a physical layer device 46 includes a receive path 47 and a transmit path 48. The transmit path 48 may be from the same channel as the receive path 47 or may be from a different channel of the data communications medium. An input of an analog filter 49 receives an analog receive signal. The analog filter 49 filters the analog receive signal and generates a filtered receive signal. An input of an analog-to-digital converter (ADC) 50 receives the filtered receive signal and generates a digital receive signal. A first input of a digital signal processor (DSP) 51 receives the digital receive signal and generates a recovered bit pattern. A transmitter 52 generates a digital transmission signal. An input of a digital-to-analog converter (DAC) 53 receives the digital transmission signal and generates an analog transmission signal.

The DSP 51 includes a digital echo/NEXT cancellation system 54. Operation of the ADC 50 is synchronized to an input clock signal. An input of a finite impulse response (FIR) filter 56 receives the digital receive signal from the ADC 50 and generates a filtered digital receive signal. An input of a bit detector 58 receives the filtered digital receive signal and generates the recovered bit pattern. An input of a decision feedback equalizer (DFE) 60 receives the recovered bit pattern and generates a digital feedback signal. A first summing module 62 receives the filtered digital receive signal and the digital feedback signal. Therefore, the signal at the input of the bit detector 58 is equal to a sum of the filtered digital receive signal from the FIR filter 56 and the digital feedback signal from the DFE 60.

Operating parameters of the FIR filter 56 and the DFE 60 are periodically adjusted so that the DSP 51 functions as desired under changing signal conditions. A second summing module 64 receives the filtered digital receive signal and the recovered bit pattern. The second summing module 64 generates an error control signal 66 that is equal to the difference between the recovered bit pattern and the filtered digital receive signal. The FIR filter 56 and the DFE 60 receive the error control signal 66. Operating parameters of the FIR filter 56 and the DFE 60 are adjusted based on value of the error control signal 66.

A digital echo canceller (DEC) 68 receives the digital transmission signal from the transmit path 48 and generates a digital echo/NEXT cancellation signal. The DEC 68 also receives the error control signal 66 from the second summing module 64. Operating parameters of the DEC 68 are adjusted based on a value of the error control signal 66. A third summing module 70 receives the digital receive signal and the digital echo/NEXT cancellation signal. The third summing module 70 outputs the difference between the digital receive signal and the digital echo/NEXT cancellation signal. Therefore, the DEC 68 effectively filters the digital receive signal to reduce adverse effects from echo/NEXT interference.

The transmit path 48 in FIG. 3 may be from the same channel as the receive path 47 or may be a transmit path 48 from another channel in the data communications medium. When the transmit path 48 is from the same channel as the receive path 47, the DEC 68 generates an estimated echo signal. When the transmit path 48 is from another channel in the data communications medium, the DEC 68 generates an estimated NEXT signal.

The digital echo/NEXT cancellation system 54 is effective at filtering the digital receive signal when the level of echo/NEXT interference in the digital receive signal is below a maximum threshold. However, the effectiveness of the digital echo/NEXT cancellation system 54 reduces as the contribution of echo/NEXT interference signals in the analog receive signal increases. For example, Ethernet network devices that are compliant with IEEE 802.3an (10GBASE-T) are being developed. The increased data transmission rate requirements of 10GBASE-T lead to increased levels of echo/NEXT interference in receive paths 47 of the data communications channels. This dramatically reduces the resolution of the ADC 50 in the receive path 47.

The present invention is an adaptive analog echo/near-end crosstalk (NEXT) cancellation system. The adaptive analog echo/NEXT cancellation system includes an adaptive analog filter that generates estimated echo/NEXT signals to reduce echo/NEXT interference in the receive paths of communications channels. Operation of the adaptive analog filter is analogous to operation of a finite impulse response (FIR) filter in a digital signal processor (DSP) and the adaptive analog filter includes adjustable coefficients. The adaptive analog filter operates in two modes based on the presence of remotely transmitted signals in the receive path as will be further described below.

Figure 4:
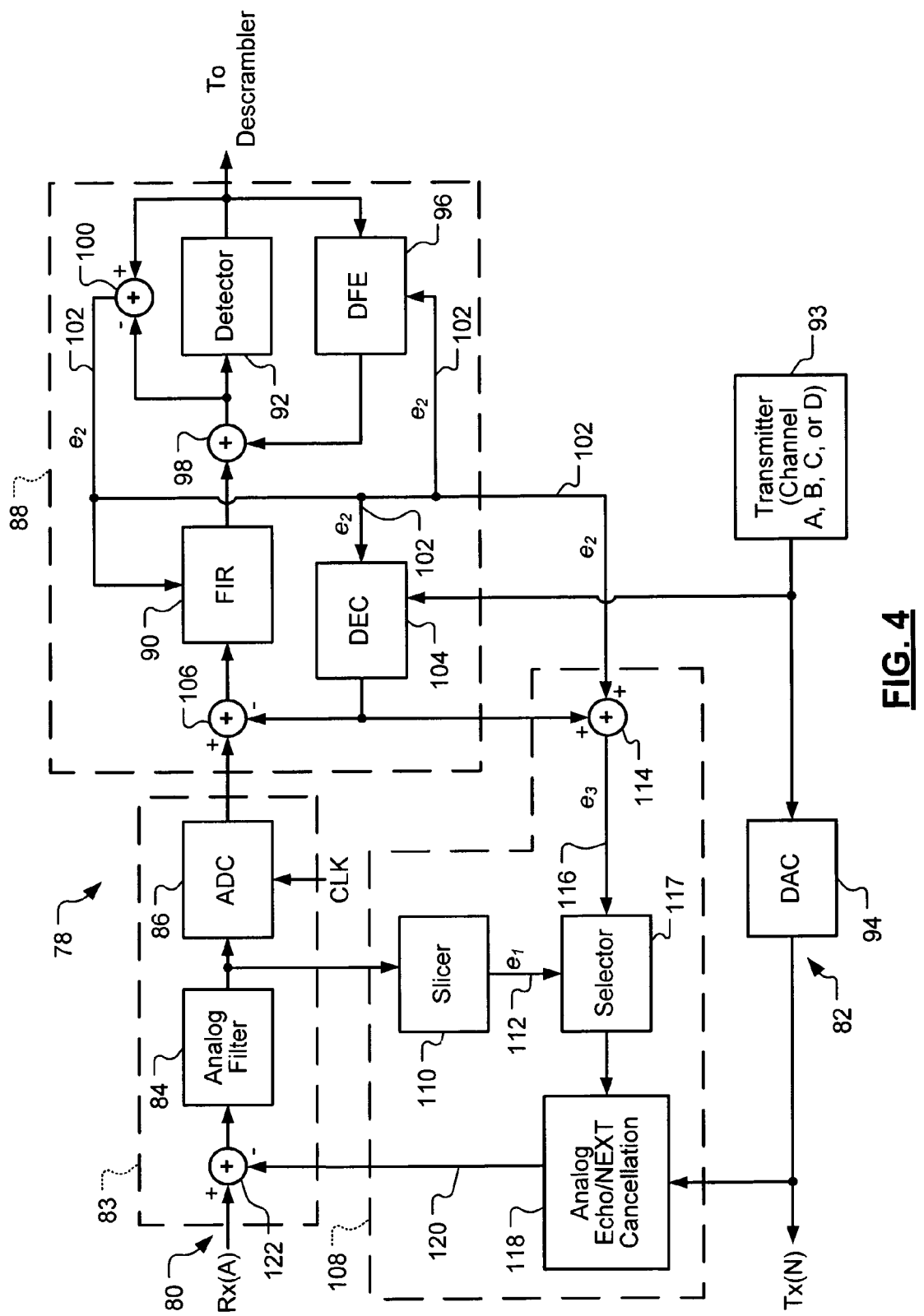
FIG. 4 is a functional block diagram of an adaptive analog echo/NEXT cancellation system according to the present invention.

Referring now to FIG. 4, a physical layer device 78 of an exemplary Ethernet network device processes data for a communications channel of a data communications medium. The communications channel includes a receive path 80 and a transmit path 82. The transmit path 82 may be from the same channel as the receive path 80 or may be from a different channel of the data communications medium. An analog front end (AFE) device 83 includes an analog filter 84 and a first analog-to-digital converter (ADC) 86. An input of the analog filter 84 receives an analog receive signal and generates a filtered receive signal. For example, an analog amplifier may transmit the analog receive signal to the analog filter 84. An input of the first ADC 86 receives the filtered receive signal and a first clock signal and generates a digital receive signal. A DSP 88 includes an FIR filter 90. An input of the FIR filter 90 receives the digital receive signal and generates a filtered digital receive signal. An input of a bit detector 92 in the DSP 88 receives the filtered digital receive signal and generates a recovered bit pattern. For example, the bit detector 92 may transmit the recovered bit pattern to a descrambler in a PCS device.

A transmitter 93 in the transmit path 82 generates a digital transmission signal. An input of a digital-to-analog converter (DAC) 94 in the transmit path 82 receives the digital transmission signal and generates an analog transmission signal. For example, the DAC 94 may transmit the analog transmission signal to a line driver in the in the communications channel. An input of a decision feedback equalizer (DFE) 96 in the DSP 88 receives the recovered bit pattern and generates a feedback signal. A first summing module 98 receives the feedback signal and the filtered digital receive signal is equal to the sum of the filtered digital receive signal and the feedback signal at the input of the bit detector 92. A second summing module 100 receives the filtered digital receive signal from the input of the bit detector 92 and the recovered bit pattern from the output of the bit detector 92. The second summing module 100 outputs an error control signal $e_2$ 102, which is equal to the difference between the recovered bit pattern and the filtered digital receive signal. The FIR filter 90 and the DFE 96 receive the error control signal $e_2$ 102 and a value of the error control signal $e_2$ 102 adjusts the operating parameters of the FIR filter 90 and the DFE 96.

The DSP 88 includes a digital echo canceller (DEC) 104 that receives the digital transmission signal and the error control signal $e_2$ 102. The DEC 104 generates a digital echo/NEXT cancellation signal based on the digital transmission signal. A third summing module 106 receives the digital echo/NEXT cancellation signal and outputs the difference between the digital receive signal and the digital echo/NEXT cancellation signal. The DEC 104 estimates echo and/or NEXT interference signals in the digital receive signal. Operating parameters of the DEC 104 are adjusted based on a value of the error control signal $e_2$ 102.

An adaptive analog echo/NEXT cancellation system 108 according to the present invention includes a bit slicer 110 that receives the filtered receive signal. The bit slicer 110 generates an error control signal $e_1$ 112 based on the filtered receive signal. A fourth summing module 114 in the adaptive analog echo/NEXT cancellation system 108 receives the digital echo/NEXT cancellation signal and the error control signal $e_2$ 102. The fourth summing module 114 generates an error control signal $e_3$ 116 by summing the digital echo/NEXT cancellation signal and the error control signal $e_2$ 102.

The error control signal $e_3$ 116 includes the error control signal $e_2$ 102, which is typically used as an adaptation error signal for the DSP 88 components including the FIR filter 90, the DEC 104, and the DFE 96. Since both the adaptive analog echo/NEXT cancellation system 108 and the DEC 104 operate simultaneously in the communications channel, operation of the adaptive analog echo/NEXT cancellation system 108 and the DEC 104 is coordinated. Therefore, the digital echo/NEXT cancellation signal and the error control signal $e_2$ 102 are summed to generate the error control signal $e_3$ 116. A first input of a selector 117 receives the error control signal $e_1$ 112 and a second input of the selector 117 receives the error control signal $e_3$ 116. The selector 117 outputs the error control signal $e_1$ 112 during a first mode and the error control signal $e_3$ 116 during a second mode.

The adaptive analog echo/NEXT cancellation system 108 also includes an analog echo/NEXT cancellation module 118. The analog echo/NEXT cancellation module 118 receives the analog transmission signal and one of the error control signal $e_1$ 112 or the error control signal $e_3$ 116 from the selector 117. The analog echo/NEXT cancellation module 118 generates an analog echo/NEXT cancellation signal 120 based on the analog transmission signal. Operating coefficients of the analog echo/NEXT cancellation module 118 are adjusted based on a value of one of the error control signal $e_1$ 112 or the error control signal $e_3$ 116 from the selector 117. A fifth summing module 122 in the receive path 80 receives the analog receive signal and the analog echo/NEXT cancellation signal 120. The fifth summing module 122 subtracts the analog echo/NEXT cancellation signal 120 from the analog receive signal. Therefore, the value of the analog receive signal at the input of the analog filter 84 is equal to the value of the analog receive signal less the value of the analog echo/NEXT cancellation signal 120.

The first mode is a start-up mode and occurs when the analog receive signal does not include a remotely transmitted signal. For example, the first mode may be initiated as part of a start-up procedure of the physical layer device 78 when the analog receive signal does not typically include a remotely transmitted signal. In other words, the analog receive signal only includes echo, NEXT, and/or other interference signal impairments. For example, during the first mode when the analog echo/NEXT cancellation module 118 operates ideally, the value of the filtered analog signal is equal to zero. Following the start-up mode, if the echo response in the receive path 80 does not significantly change, the operating coefficients of the analog echo/NEXT cancellation module 118 may be fixed. In this case, the DEC 104 in the DSP 88 employs traditional digital echo/NEXT cancellation techniques to estimate any residual echo/NEXT interference signals in the receive path 80 that have not been removed by the adaptive analog echo/NEXT cancellation system 108.

The echo response in the receive path 80 may change dramatically during normal operations. For example, the echo response may change due to a change in temperature or another adverse condition. Therefore, it is desirable for the analog echo/NEXT cancellation module 118 to remain adaptive during normal operations. The second mode occurs when the analog receive signal includes a remotely transmitted signal (or during normal operations). For example, the analog receive signal typically includes a remotely transmitted signal following an initial start-up procedure of the physical layer device 78. During the second mode, the analog echo/NEXT cancellation module 118 is preferably not adapted by the value of the error control signal $e_1$ 112. This is because the presence of a remotely transmitted signal in the receive path 80 makes the error control signal $e_1$ 112 too noisy. Therefore, during the second mode, the selector 117 outputs the error control signal $e_3$ and the analog echo/NEXT cancellation module 118 is adapted by the value of the error control signal $e_3$ 116.

Figure 5:
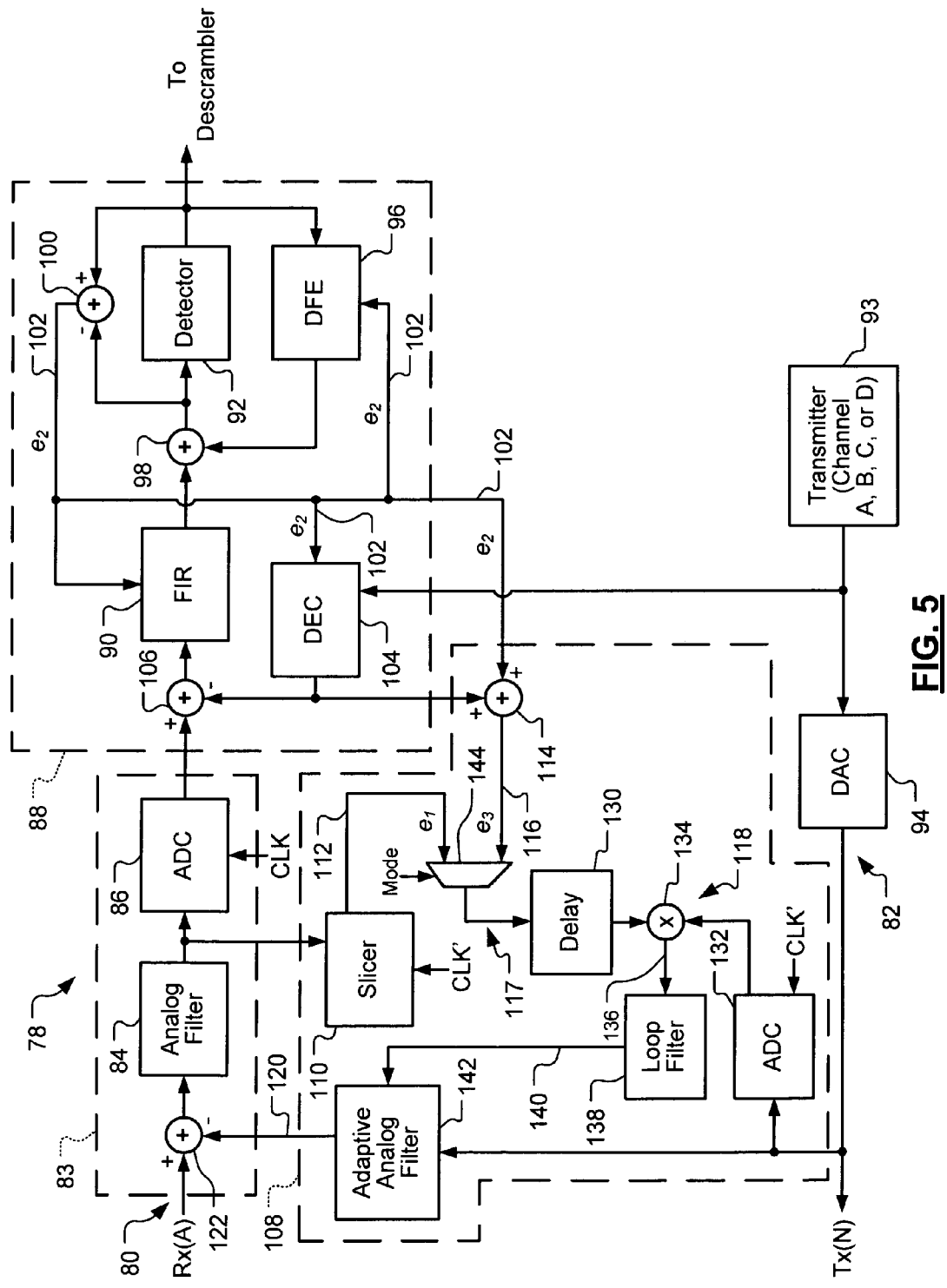
FIG. 5 is a functional block diagram of the adaptive analog echo/NEXT cancellation system of FIG. 4 illustrated in further detail.

Referring now to FIG. 5, the analog echo/NEXT cancellation module 118 of FIG. 4 is illustrated in further detail. The analog echo/NEXT cancellation module 118 includes a delay module 130 that selectively delays one of the error control signal $e_1$ 112 or the error control signal $e_3$ 116. The delay module 130 fixes a relative delay of the error signals so that the delay is matched properly according to the latency between the input of the first ADC 86 and the output of the bit detector 92. The analog echo/NEXT cancellation module 118 also includes a second ADC 132 that receives the analog transmission signal and generates a sampled transmission signal. A product module 134 receives the delayed error control signals and the sampled transmission signal. The product module 134 generates an adaptation signal 136 by multiplying the selected error control signal and the sampled transmission signal.

An input of a loop filter 138 receives the adaptation signal 136 and generates a filtered adaptation signal 140. An adaptive analog filter 142 receives the analog transmission signal and the filtered adaptation signal 140. The adaptive analog filter 142 generates an estimated echo/NEXT signal that is included in the analog receive signal. A value of the filtered adaptation signal 140 adjusts the operating coefficients of the adaptive analog filter 142. In an exemplary embodiment, the selector 117 includes a multiplexer 144. For example, the selector 117 may include a 2-to-1 multiplexer 144 that selectively outputs either the error control signal $e_1$ or the error control signal $e_3$ based on a value of a mode select signal. For example, in an exemplary embodiment, the value of the mode select signal changes depending on whether the physical layer device 78 is performing an initial start-up procedure.

Figure 6:
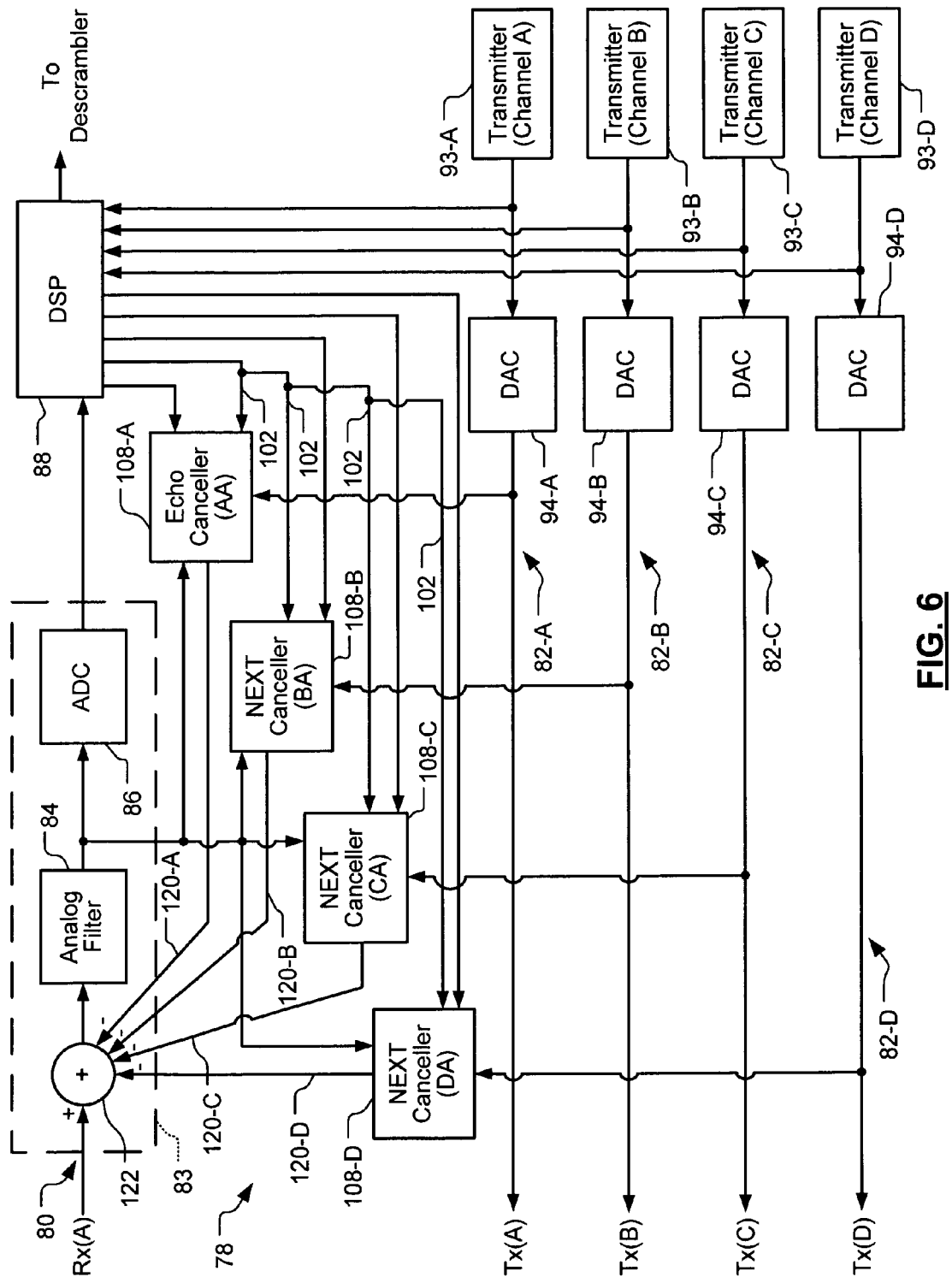
FIG. 6 is a functional block diagram of an exemplary comprehensive analog echo/NEXT cancellation system for a communications channel of a data communications medium.

Referring now to FIG. 6, an exemplary comprehensive analog echo/NEXT cancellation system for channel A of a four channel full-duplex communications medium is shown. The DSP 88 receives digital transmission signals from all four channels. An analog echo canceller 108-A and three analog NEXT cancellers 108-B, 108-C, and 108-D receive analog transmission signals from respective communications channels. For example, the analog echo canceller 108-A receives the analog transmission signal from channel A. The analog echo canceller 108-A and the analog NEXT cancellers 108-B, 108-C, and 108-D also receive the filtered receive signal from the receive path 80.

The analog echo canceller 108-A and the analog NEXT cancellers 108-B, 108-C, and 108-D receive respective digital echo/NEXT cancellation signals from the DSP 88. For example, the echo canceller 108-A receives the digital echo/NEXT cancellation signal from the DSP 88 with respect to channel A. The analog echo canceller 108-A and the analog NEXT cancellers 108-B, 108-C, and 108-D also receive the error control signal $e_2$ 102 from the DSP 88. Therefore, each communications channel of the data communications medium includes an analog echo canceller 108-A and three analog NEXT cancellers 108-B, 108-C, and 108-D. The analog echo canceller 108-A and the analog NEXT cancellers 108-B, 108-C, and 108-D output respective analog echo/NEXT cancellation signals 120. The fifth summing module 122 sums the analog receive signal and the analog echo/NEXT cancellation signals 120 to filter the analog receive signal. Likewise, each of the DSPs 88 in the four channels of the communications medium include a DEC 104 that operates as an echo canceller and three digital filters that operate as NEXT cancellers. Those skilled in the art can appreciate that multiple echo and/or NEXT cancellers may be integrated into a single device.

Figure 7:
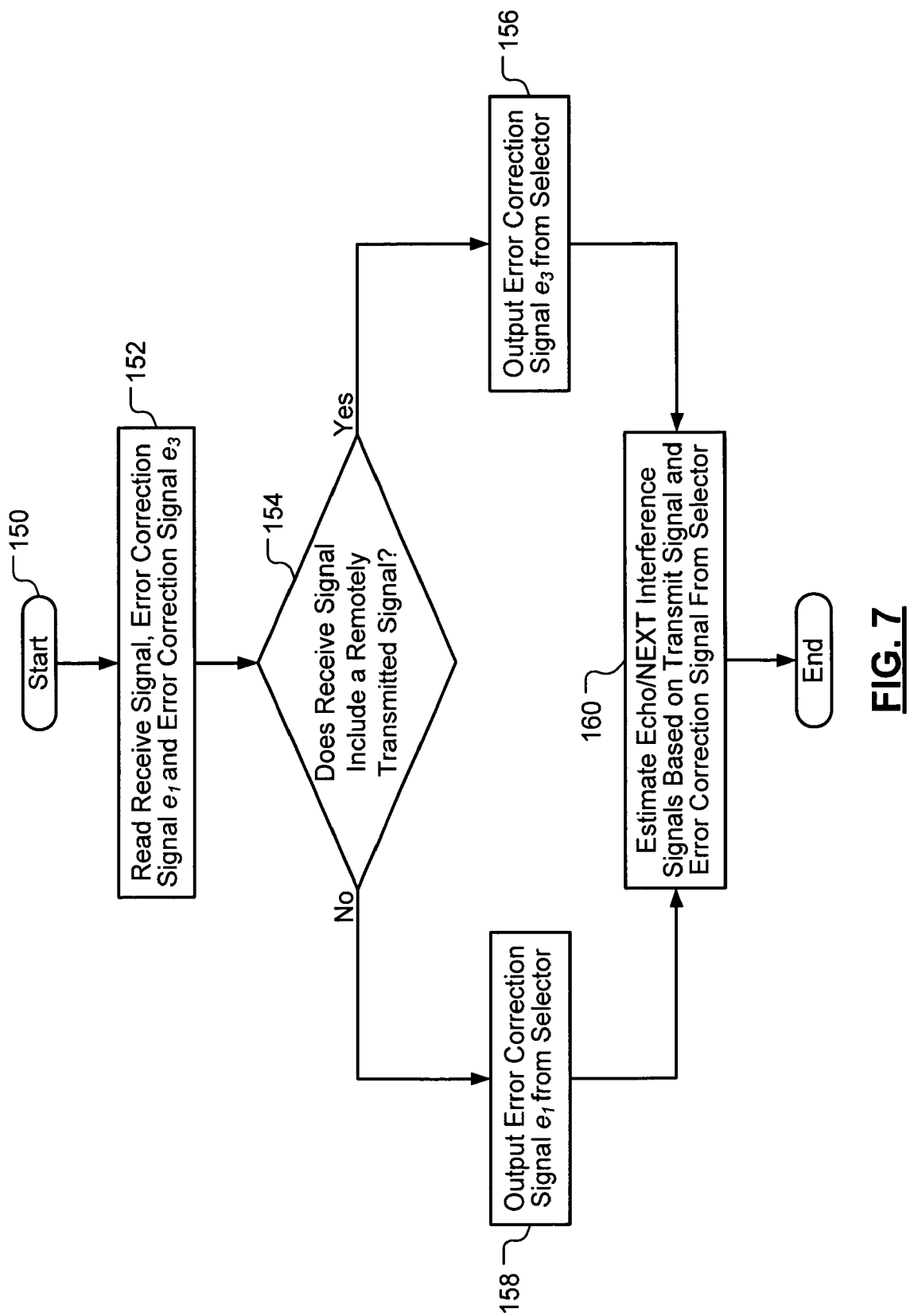
FIG. 7 is a flowchart illustrating steps performed by the adaptive analog echo/NEXT cancellation system to select the error control signal that is output by the selector.

Referring now to FIG. 7, an error control signal selection algorithm begins in step 150. In step 152, control reads the receive signal and the selector 117 reads the error control signal $e_1$ and the error control signal $e_3$. In step 154, control determines whether the receive signal includes a remotely transmitted signal. For example, control may read the mode select signal of the selector 117 to determine whether the physical layer device 78 is performing an initial start-up procedure. If true, control proceeds to step 156. If false, control proceeds to step 158. In step 156, the selector 117 outputs the error control signal $e_3$ 116 and control proceeds to step 160. In step 158, the selector outputs the error control signal $e_1$ 112 and control proceeds to step 160. In step 160, the adaptive analog filter 142 estimates echo/NEXT interference and generates the analog echo/NEXT cancellation signal 120 and control ends. The adaptive analog filter 142 estimates the analog echo/NEXT cancellation signal 120 based on the analog transmission signal and the error control signal that is output by the selector 117.

The present invention allows for greater ADC 86 resolution in communications channels that operate in high-speed full-duplex communications systems. This allows for reliable and increased data communications rates in communications systems such as IEEE 10GBASE-T systems. Analog echo/NEXT cancellers are utilized before the ADC 86 to estimate as much echo/NEXT interference as possible. At the same time, the DSP 88 retains traditional digital echo/NEXT cancellers that estimate additional echo/NEXT interference in the receive path 80 after the ADC 86. Both the bit slicer 110 and the second ADC 132 receive a second clock signal that is derived from the first clock signal of the first ADC 86. Therefore, clock mismatching problems that are typically associated with multiple echo/NEXT cancellers are avoided.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. An adaptive analog echo/near-end crosstalk (NEXT) cancellation system, comprising:
    a bit slicer that receives a first analog receive signal and that generates a first error control signal;
    a digital signal processor (DSP) that receives a digital receive signal and a digital transmit signal and that generates second and third error control signals;
    a first summing module that generates a fourth error control signal by summing said second and third error control signals;
    a selector that outputs said first error control signal during a first mode and said fourth error control signal during a second mode; and
    an echo/NEXT cancellation module that communicates with said selector and that generates an estimated echo/NEXT signal based on said first error control signal and an analog transmit signal during said first mode and based on said fourth error control signal and said analog transmit signal during said second mode.

2. The adaptive analog echo/NEXT cancellation system of claim 1 wherein said first analog receive signal, said digital receive signal, and said analog and digital transmit signals are from a first communications channel and wherein said echo/NEXT cancellation module generates an estimated echo signal that is included in a second analog receive signal.

3. The adaptive analog echo/NEXT cancellation system of claim 1 wherein said first analog receive signal and said digital receive signal are from a first communications channel and said analog and digital transmit signals are from a second communications channel and wherein said echo/NEXT cancellation module generates an estimated NEXT signal that is included in a second analog receive signal.

4. A system comprising the adaptive analog echo/NEXT cancellation system of claim 1 and further comprising a second summing module that generates an echo/NEXT filtered receive signal by subtracting said estimated echo/NEXT signal from a second analog receive signal.

5. A system comprising the adaptive analog echo/NEXT cancellation system of claim 1 and further comprising an analog filter that receives a second analog receive signal and that generates said first analog receive signal.

6. A system comprising the adaptive analog echo/NEXT cancellation system of claim 1 and further comprising a first analog-to-digital converter (ADC) that receives said first analog receive signal and that generates said digital receive signal, wherein said DSP generates a recovered bit pattern based on said digital receive signal.

7. A system comprising the adaptive analog echo/NEXT cancellation system of claim 1 and further comprising a digital-to-analog converter (DAC) that receives said digital transmit signal and that generates said analog transmit signal.

8. The adaptive analog echo/NEXT cancellation system of claim 1 wherein said DSP includes a digital echo canceller (DEC) module that generates said second error control signal based on said digital transmit signal and said third error control signal.

9. The system of claim 6 wherein said DSP includes:
    a finite impulse response (FIR) filter that receives said digital receive signal and that generates a filtered digital receive signal;
    a bit detector that receives said filtered digital receive signal and that generates said recovered bit pattern; and
    a second summing module that generates said third error control signal by subtracting said filtered digital receive signal from said recovered bit pattern.

10. The adaptive analog echo/NEXT cancellation system of claim 1 wherein said selector includes a multiplexer that selectively outputs one of said first error control signal or said fourth error control signal.

11. The adaptive analog echo/NEXT cancellation system of claim 1 wherein said echo/NEXT cancellation module includes:
    a first ADC converter that receives said analog transmit signal and that generates a sampled transmit signal;
    a product module that receives said first error control signal during said first mode and said fourth error control signal during said second mode, that receives said sampled transmit signal, and that generates an adaptation signal by multiplying one of said first or fourth error control signals and said sampled transmit signal; and
    an adaptive analog filter that generates said estimated echo/NEXT signal based on said analog transmit signal and said adaptation signal.

12. The adaptive analog echo/NEXT cancellation system of claim 11 wherein said echo/NEXT cancellation module further includes a delay module that selectively delays said one of said first or fourth error control signals.

13. The adaptive analog echo/NEXT cancellation system of claim 11 wherein said echo/NEXT cancellation module further includes a loop filter that receives said adaptation signal and that generates a filtered adaptation signal and wherein said adaptive analog filter generates said estimated echo/NEXT signal based on said analog transmit signal and said filtered adaptation signal.

14. The adaptive analog echo/NEXT cancellation system of claim 1 wherein said first mode occurs when said first analog receive signal does not include a remotely transmitted signal and wherein said second mode occurs when said first analog receive signal includes a remotely transmitted signal.

15. A physical layer device comprising the adaptive analog echo/NEXT cancellation system of claim 1.

16. An Ethernet network device comprising the physical layer device of claim 15.

17. The physical layer device of claim 15 wherein said physical layer device is compliant with at least one of IEEE 802.3ab (1000BASE-T) and/or IEEE 802.3an (10GBASE-T) standards.

18. An adaptive analog echo/near-end crosstalk (NEXT) cancellation system, comprising:
    bit slicing means for receiving a first analog receive signal and for generating a first error control signal;
    signal processing means for receiving a digital receive signal and a digital transmit signal and for generating second and third error control signals;
    first summing means for generating a fourth error control signal by summing said second and third error control signals;
    selecting means for outputting said first error control signal during a first mode and said fourth error control signal during a second mode; and
    echo/NEXT canceling means, that communicates with said selecting means, for generating an estimated echo/NEXT signal based on said first error control signal and an analog transmit signal during said first mode and based on said fourth error control signal and said analog transmit signal during said second mode.

19. The adaptive analog echo/NEXT cancellation system of claim 18 wherein said first analog receive signal, said digital receive signal, and said analog and digital transmit signals are from a first communications channel and wherein said echo/NEXT canceling means generates an estimated echo signal that is included in a second analog receive signal.

20. The adaptive analog echo/NEXT cancellation system of claim 18 wherein said first analog receive signal and said digital receive signal are from a first communications channel and said analog and digital transmit signals are from a second communications channel and wherein said echo/NEXT canceling means generates an estimated NEXT signal that is included in a second analog receive signal.

21. A system comprising the adaptive analog echo/NEXT cancellation system of claim 18 and further comprising second summing means for generating an echo/NEXT filtered receive signal by subtracting said estimated echo/NEXT signal from a second analog receive signal.

22. A system comprising the adaptive analog echo/NEXT cancellation system of claim 18 and further comprising filtering means for receiving a second analog receive signal and for generating said first analog receive signal.

23. A system comprising the adaptive analog echo/NEXT cancellation system of claim 18 and further comprising first converting means for receiving said first analog receive signal and for generating said digital receive signal, wherein said signal processing means generates a recovered bit pattern based on said digital receive signal.

24. A system comprising the adaptive analog echo/NEXT cancellation system of claim 18 and further comprising converting means for receiving said digital transmit signal and for generating said analog transmit signal.

25. The adaptive analog echo/NEXT cancellation system of claim 18 wherein said signal processing means includes digital echo canceling means for generating said second error control signal based on said digital transmit signal and said third error control signal.

26. The system of claim 23 wherein said signal processing means includes:
    filtering means for receiving said digital receive signal and for generating a filtered digital receive signal;
    bit detecting means for receiving said filtered digital receive signal and for generating said recovered bit pattern; and
    second summing means for generating said third error control signal by subtracting said filtered digital receive signal from said recovered bit pattern.

27. The adaptive analog echo/NEXT cancellation system of claim 18 wherein said selecting means includes multiplexing means for selectively outputting one of said first error control signal or said fourth error control signal.

28. The adaptive analog echo/NEXT cancellation system of claim 18 wherein said echo/NEXT canceling means includes:
    first converting means for receiving said analog transmit signal and for generating a sampled transmit signal;
    multiplying means for receives said first error control signal during said first mode and said fourth error control signal during said second mode, for receiving said sampled transmit signal, and for generating an adaptation signal by multiplying one of said first or fourth error control signals and said sampled transmit signal; and
    adaptive analog filtering means for generating said estimated echo/NEXT signal based on said analog transmit signal and said adaptation signal.

29. The adaptive analog echo/NEXT cancellation system of claim 28 wherein said echo/NEXT canceling means further includes delaying means for selectively delaying said one of said first or fourth error control signals.

30. The adaptive analog echo/NEXT cancellation system of claim 28 wherein said echo/NEXT canceling means further includes loop filtering means for receiving said adaptation signal and for generating a filtered adaptation signal and wherein said adaptive analog filtering means generates said estimated echo/NEXT signal based on said analog transmit signal and said filtered adaptation signal.

31. The adaptive analog echo/NEXT cancellation system of claim 18 wherein said first mode occurs when said first analog receive signal does not include a remotely transmitted signal and wherein said second mode occurs when said first analog receive signal includes a remotely transmitted signal.

32. A physical layer device comprising the adaptive analog echo/NEXT cancellation system of claim 18.

33. An Ethernet network device comprising the physical layer device of claim 32.

34. The physical layer device of claim 32 wherein said physical layer device is compliant with at least one of IEEE 802.3ab (1000BASE-T) and/or IEEE 802.3an (10GBASE-T) standards.

35. A method for operating an adaptive analog echo/near-end crosstalk (NEXT) cancellation system, comprising:
    sampling a first analog receive signal to generate a first error control signal;
    processing a digital receive signal and a digital transmit signal to generate second and third error control signals;
    generating a fourth error control signal by summing said second and third error control signals; and generating an estimated echo/NEXT signal based on said first error control signal and an analog transmit signal during a first mode and based on said fourth error control signal and said analog transmit signal during a second mode.

36. The method of claim 35 wherein said first analog receive signal, said digital receive signal, and said analog and digital transmit signals are from a first communications channel and wherein said estimated echo/NEXT signal is an estimated echo signal that is included in a second analog receive signal.

37. The method of claim 35 wherein said first analog receive signal and said digital receive signal are from a first communications channel and said analog and digital transmit signals are from a second communications channel and wherein said estimated echo/NEXT signal is an estimated NEXT signal that is included in a second analog receive signal.

38. The method of claim 35 further comprising generating an echo/NEXT filtered receive signal by subtracting said estimated echo/NEXT signal from a second analog receive signal.

39. The method of claim 35 further comprising filtering a second analog receive signal to generate said first analog receive signal.

40. The method of claim 35 further comprising:

converting said first analog receive signal to generate said digital receive signal; and processing said digital receive signal to generate a recovered bit pattern.

41. The method of claim 35 further comprising converting said digital transmit signal to generate said analog transmit signal.

42. The method of claim 35 wherein said first mode occurs when said first analog receive signal does not include a remotely transmitted signal and wherein said second mode occurs when said first analog receive signal includes a remotely transmitted signal.

* * * * *